Jan. 31, 1956   W. H. TANKE ET AL   2,732,784
PLOW HITCH

Filed Nov. 1, 1951   2 Sheets-Sheet 1

Inventors
Willard H. Tanke
Robert H. Reaves
by
Attorney

Jan. 31, 1956   W. H. TANKE ET AL   2,732,784
PLOW HITCH
Filed Nov. 1, 1951   2 Sheets-Sheet 2
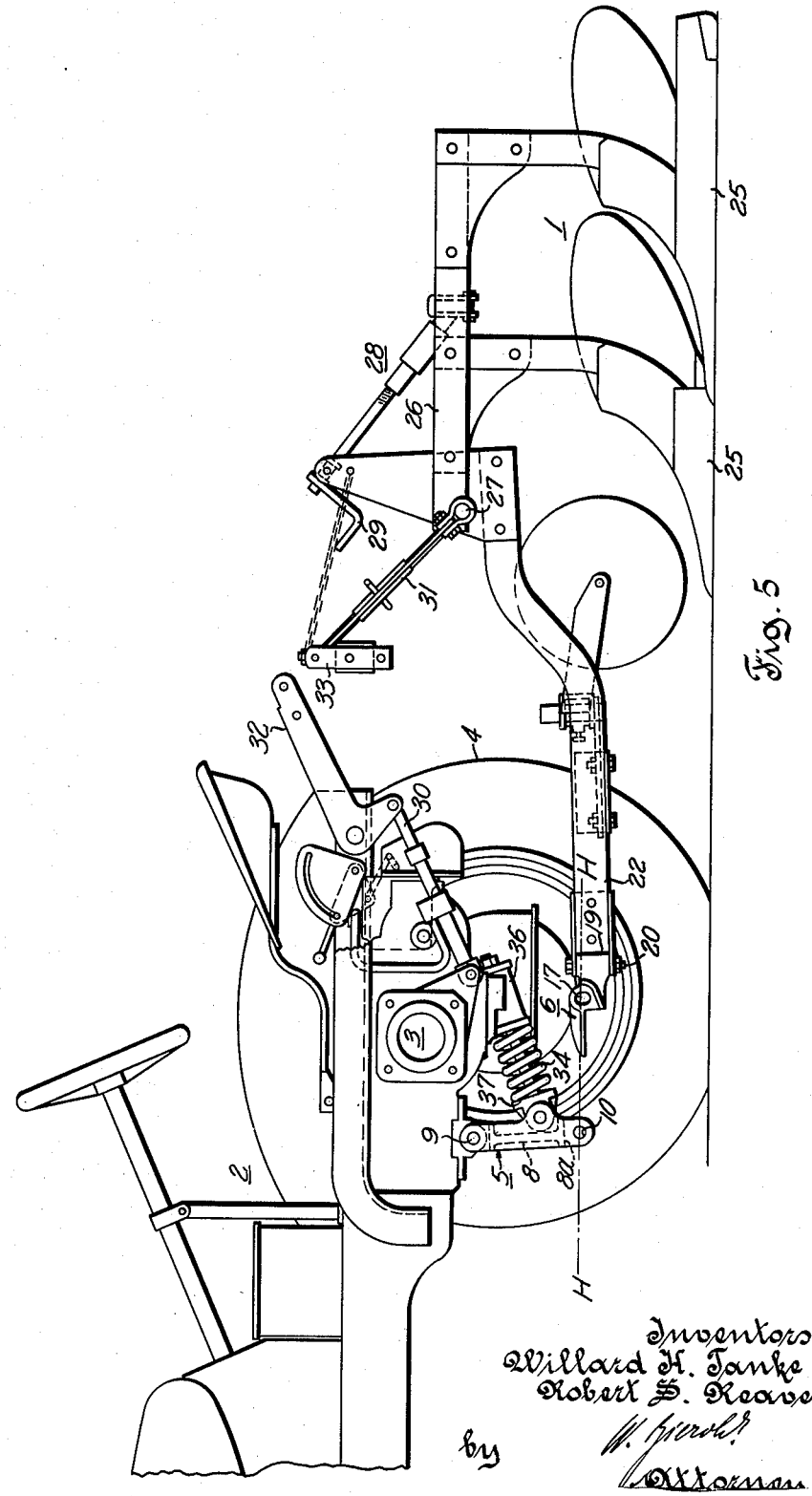

United States Patent Office 2,732,784
Patented Jan. 31, 1956

2,732,784
PLOW HITCH

Willard H. Tanke, La Crosse, and Robert S. Reaves, West Salem, Wis., assignors to Allis-Chalmers Manufacturing Company, Milwaukee, Wis.

Application November 1, 1951, Serial No. 254,347

7 Claims. (Cl. 97—47.14)

This invention relates generally to tractor propelled implements and is more particularly concerned with and directed toward the provision of a coupling means facilitating attachment of a draft structure, pull bar, or the like, to a tractor carried draft element.

The principal object of the invention is to provide an improved tractor implement combination, and more particularly a tractor pick-up plow combination, which permits attachment of the implement component to and its detachment from the tractor component in such a manner that the attaching operation as well as the detaching operation may be performed quickly and without undue physical effort by one man and without the aid of any special tools.

A further object of the invention is to provide an improved tractor implement combination of the hereinabove outlined character which is operable on the "drive-over" principle and which, accordingly, incorporates an implement component which is capable of standing on the ground as a self-supported unit while the tractor component is moved, under its own power, either over or away from the implement component for purposes of attachment and detachment, respectively.

More specifically, the present invention contemplates and has as an object the provision of a coupling means incorporating implement carried and tractor carried parts which are cooperable with each other in an improved manner for readily placing transverse openings therethrough in coupling pin receiving alignment with each other.

A further object of this invention is the provision of a coupling means embodying improvements as to compactness, simplicity and durability, all to the end of obtaining an inexpensive structure which can be readily attached to a pull bar, or the like, and will function as aforesaid.

These and other objects and advantages are attained by the present invention various novel features of which will be apparent from the description herein and the accompanying drawings, disclosing an embodiment of the invention, and will be more particularly pointed out in the appended claims.

Referring to the drawings:

Fig. 5 is a view similar to Fig 1 but showing the tractor and plow in detached relation to each other.

Figure 1:
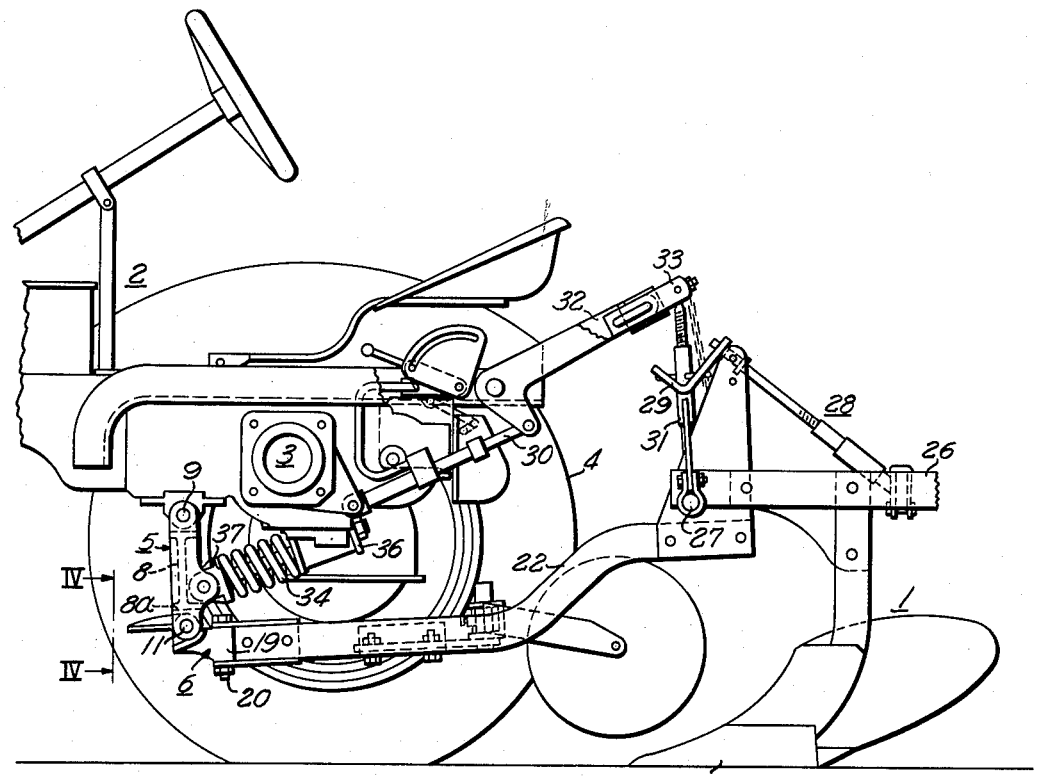
Fig. 1 is a side elevation of a tractor and pick-up plow combination embodying the invention.
Figure 2:
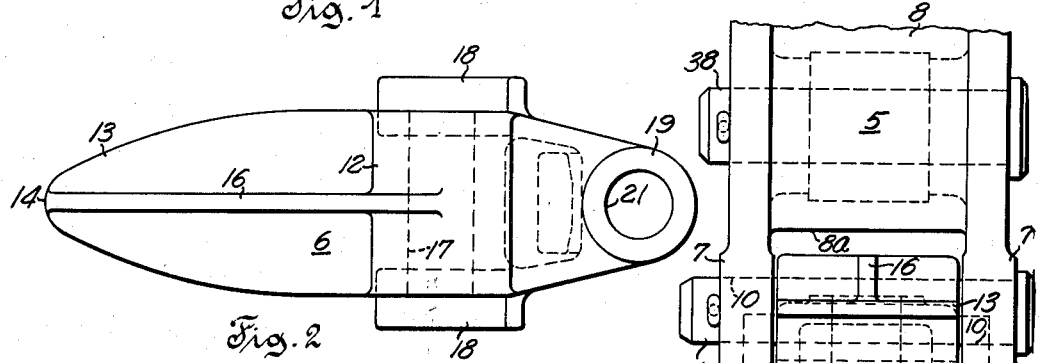
Fig. 2 is an enlarged plan view of the plow connected coupling element.

For illustrative purposes, an embodiment of the present invention is shown in Fig. 1 as being utilized for the coupling of a rear mounted pick-up plow 1 to a tractor 2 having a rear axle structure 3 supported on laterally spaced wheels, only one of which is shown in Fig. 1 and designated by the reference character 4.

Coupling of the plow 1 to the tractor 2 is brought about by the use of a pair of coupling elements one of which is connected to the tractor and generally designated by the reference character 5, and the other of which is connected to the plow and generally designated by the reference character 6. The tractor connected coupling element or draft element 5 is in the form of a coupling yoke having relatively spaced depending leg portions 7 which are rigidly connected and kept in transverse alignment with each other by a cross member 8. The draft element 5 is pivotally mounted at its upper end on the tractor by means of a pin 9 and has a pair of transversely aligned openings 10 at its lower end to receive a coupling or pivot pin 11.

The implement or plow bar connected coupling element 6 comprises a body member, part of which forms a transverse trunnion yoke 12 and another part of which forms a forwardly converging nose piece 13. The nose piece 13, as viewed in plan, tapers forwardly into a rounded point 14. At its upper side the coupling element 6 has a centrally located rib or flange 16 which merges with and extends forwardly from the yoke 12. The upper edge of the rib 16 extends forwardly and downwardly toward the top surface of the nose piece 13 with which it merges at the rounded point 14 of the latter. Formed in the trunnion yoke 12 of the coupling element 6 is a transverse opening 17 for receiving the coupling pin 11. The opening 17 has an oblong cross section which facilitates insertion of the pin into the opening and which also permits limited vertical and transverse tilting movement of the pin 11 and coupling element 6 relative to each other. Below and extending laterally outward from the yoke 12 at each side of the coupling element 6 are projecting portions 18 each of which presents an upwardly and forwardly facing socket surface. The socket projections 18 are located generally below the yoke 12 and are concavely curved so that each presents a horizontal slide surface 18a and a substantially vertical stop surface 18b. The nose 13, rib 16, yoke 12 and socket projections 18 are merged in a single body casting, and the rear portion of the coupling element 6 is formed by a vertically, or nearly vertically, positioned hinge sleeve 19 which is an integral part of said body casting. A cylindrical bore 21 of the hinge sleeve 19 is adapted to receive a hinge pin 20 to connect the pull bar 22 of the plow with the coupling element 6 and thereby provide for horizontal pivoting of the plow 1 relative to the tractor.

Referring to Fig. 5, the plow 1 has a pair of plow bottoms 25 rigidly attached to a plow frame 26. The pull bar 22 is pivotally connected to the plow frame 26 by means of a transversely extending pin or rod 27 which permits vertical angling of the plow frame with respect to the pull bar 22. The angle between the pull bar and frame may be adjusted by means of a beaming device, generally designated by the reference character 28, which is actuated by a crank 29. A pair of lift links, one of which is indicated in Figs. 1 and 5 by the reference character 31, are connected at their lower ends to the rod 27 at opposite sides of the plow. In the connected condition of the plow as shown in Fig. 1, the link 31 is connected at its upper end to a power actuated lift arm 32 by means of a fitting 33, and the other lift link is similarly connected with another lift arm corresponding to and spaced transversely of the tractor from the lift arm 32. The lift links 31 and associated parts provide lift connections between the tractor and plow, while the pin 11 completes the draft connection between the tractor and plow. The lift arms 32 form part of a hydraulically operated power lift mechanism which is mounted on the tractor and includes a pair of hydraulic rams 30, one of which is shown in partly expanded condition in each of Figs. 1 and 5.

Figures 3, 4:
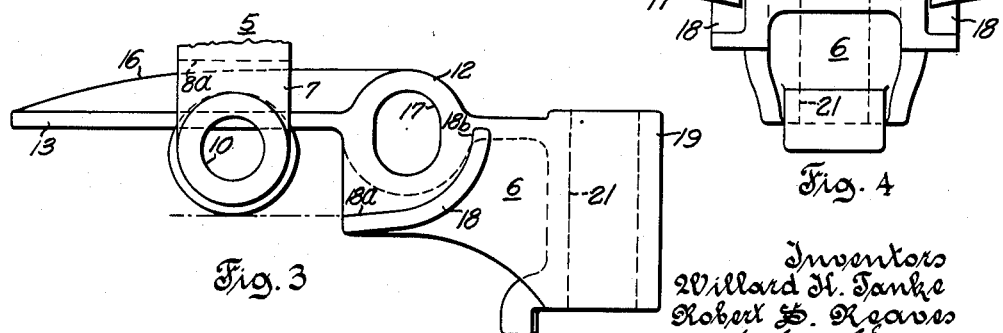
Fig. 3 is a side view of the coupling element shown in Fig. 2, together with part of an associated coupling yoke.
Fig. 4 is an enlarged view on line IV—IV of Fig 1 and showing a front view of the coupling element shown in Fig 2 and of associated parts shown in Fig. 1.

At the underside of the rear axle structure 3 of the tractor, a heavy coil spring 34 is operatively interposed in load transmitting relation between the tractor connected coupling element 5 and a depending abutment 36 on the rear axle structure 3. A seat 37 for the spring 34 is pivoted on the coupling element 5 between the legs 7 of the latter as shown in Fig. 4, by means of a transverse pivot pin 38. A suitable control mechanism, not shown, is operatively connected with the coupling element 6 for purposes of automatic draft regulation in conformity with well established principles.

Referring to Fig. 1, the plow 1 is shown resting on the ground in connected condition. To disconnect the plow it is only necessary to remove coupling pin 11 and fittings 33, and then drive the tractor forward, which will leave the plow 1 resting on the ground, as shown in Fig. 5. The plow bottoms 25 will support the frame and the pull bar in a position ready for reconnection of the coupling elements 5 and 6 upon rearward movement of the tractor from the position in which it is shown in Fig. 5.

To hitch the plow 1 to the tractor 2 it is necessary that the openings 10 in the draft element 5 be in approximate horizontal and vertical alignment with the oblong opening 17 in the plow connected coupling element. Approximate vertical aligment may be obtained by use of the beaming device 28. Since the plow frame 26 is rigidly attached to the plow bottoms which are resting on the ground, actuation of the crank 29 will bring about a change in angle between the plow frame 26 and the pull bar 22, with the result that the plow connected coupling element 6 may be positioned at the required vertical height shown in Fig. 5, by manipulation of the crank 29. This adjustment is normally made when the plow is disconnected from the tractor so that readjustment will not be necessary prior to reconnection. Horizontal alignment of the openings of the coupling elements 5 and 6 is effected by steering the rearwardly moving tractor 2 to the approximately correct position with respect to the plow supported coupling element 6.

After preparatory vertical and horizontal alignment of the coupling elements is obtained by maneuvering the tractor with respect to the pull bar 22, as stated, accurate and final alignment may be obtained by moving the tractor rearwardly an additional amount so that the draft element 5 acts as a guiding member and the plow connected coupling element 6 acts as the guided member. As the tractor moves rearwardly, the forward portion of the nose piece 13 of the guided member or plow connected coupling element 6 is received between the downwardly depending legs 7 of the guiding member or draft element 5. The rearward motion of the tractor is continued until the lower surfaces of the legs 7 of the draft element become seated on the socket projections 18 of the plow connected coupling element 6. Final vertical and horizontal adjustment is obtained when the lower surfaces of the draft element 5 contact the generally horizontal sliding surfaces 18a of the socket projections 18 and subsequently engage the vertical stop surfaces 18b, with the result that the openings 10 in the lower portion of the draft element 5 align with the oblong opening 17 in the plow con-nected coupling element 6. It should be noted that the rear portion of each of the socket projections 18 forms a stop means which serves to bring about longitudinal alignment of the two coupling elements. After final vertical, horizontal and longitudinal alignment is obtained, the connecting of the plow to the tractor is completed by the insertion of the coupling pin 11 into the aligned openings 10 and 17 of the coupling elements 5 and 6, respectively, and by connection of the lift links 31 with the lift arms 32 by means of the fittings 33.

From the foregoing, it is seen that the adjustments required in connecting the plow 1 to the tractor 2 are made in two stages. The first stage is that of vertically positioning of the plow connected coupling element 6 approximately to the desired height by means of a beaming device 28, and of approximately aligning the draft element 5 and the plow connected coupling element 6 with each other transversely of the tractor by steering the tractor during the course of its rearward movement. After the first stage of approximate alignment of the coupling elements with respect to each other is accomplished, the second stage of adjustment takes place automatically as the tractor is moved rearwardly an additional amount.

In Fig. 5, the plow connected coupling element 6 is shown as being sustained in a vertical position which is such that the elevation of the coupling element 6 above the ground, as determined by the center spacing of the opening 17 from the ground, is exactly the same as that of the coupling pin receiving openings 10. The broken line H—H in Fig. 5 designates a horizontal plane through the axis of the coupling pin receiving openings 10, and in the condition of the parts as shown in Fig. 5 said horizontal plane passes through the center of the oblong opening 17 of the complementary coupling element 6. In actual practice, when the plow rests as a self-supported unit on the ground in detached condition, the complementary coupling element 6 may be positioned somewhat higher than shown in Fig. 5 with reference to the plane H—H. In that event, rearward movement of the tractor from the position shown in Fig. 5 relative to the plow while the latter rests on the ground, will first bring the lower edge 8a of the cross member 8 of the coupling yoke 5 into engagement with the rib 16 at the upper side of the nose piece 13, and upon continued rearward movement of the tractor final vertical adjustment of the coupling element 6 relative to the coupling element 5 will be obtained by the rear lower surfaces of the downwardly depending legs 7 of the draft element cooperating with the socket projections 18 of the plow connected coupling element. During the final rearward movement of the tractor, the lower surfaces of the downwardly depending legs 7 slide along the socket surfaces 18a and guide the plow connected coupling element 6 vertically into pin receiving alignment with the openings 10 of the draft element 5. The rear portions of the socket projections 18 and the stop surfaces 18b thereon cooperate with rear lower end surfaces of the downwardly depending legs 7 to limit relative displacement of the tractor and plow longitudinally of the tractor and to thereby bring about horizontal alignment of the transverse trunnion yoke 12 with the pin receiving openings 10 of the draft element 5.

The herein disclosed tractor implement combination provides a simple, convenient and time saving method of establishing and interrupting a draft connection between the tractor and implement components. Establishment of the draft connection requires only the vertical positioning of the implement connected coupling element 6, steering the tractor in a rearward direction so that coupling elements 5 and 6 engage with each other, and insertion of the coupling pin 11 into the aligned apertures 10 and 17. After the lift connections are completed by installation of the fittings 33 on the lift arms 32, the machine is ready for field operation.

Although the present invention has been shown and described with respect to its adaptability to a particular structure, it should be understood that it is not intended to thereby limit the invention. Various modifications and adaptations falling fairly within the scope of the appended claims may readily occur to persons skilled in the art.

It is claimed and desired to secure by Letters Patent:

1. In an agricultural machine, the combination of a tractor having a rear axle structure, a coupling yoke mounted in a depending position on and connected in draft transmitting relation with said axle structure, a coupling pin extending through apertured leg portions of said yoke on a horizontal axis transversely of said tractor, a complementary coupling element pivotally connected with said coupling yoke by said coupling pin, an implement having a frame and ground engaging elements adapted to sustain said frame independently of said tractor in an elevated position above the ground, a hinge pin extending through a vertical sleeve portion of said complementary coupling element and mounted in a vertical position on a forward portion of said implement frame, a forwardly tapered nose piece forming an integral part of said complementary coupling element and adapted to enter between said leg portions of said coupling yoke, and guide means formed on said complementary coupling element and presenting a horizontal slide surface cooperable with said coupling yoke for vertically aligning said complementary coupling element in coupling pin receiving relation with said coupling yoke upon rearward movement of said tractor relative to said implement while said frame of the latter is sustained in said elevated position.

2. In an agricultural machine, the combination of a tractor having a rear axle structure, a coupling yoke mounted in a depending position on and connected in draft transmitting relation with said axle structure, a coupling pin extending through apertured leg portions of said yoke on a horizontal axis transversely of said tractor, a complementary coupling element pivotally connected with said coupling yoke by said coupling pin, an implement having a frame and ground engaging elements adapted to sustain said frame independently of said tractor in an elevated position above the ground, a hinge pin extending through a vertical sleeve portion of said complementary coupling element and mounted in a vertical position on a forward portion of said implement frame, a forwardly tapered nose piece forming an intgeral part of said complementary coupling element and adapted to enter between said leg portions of said coupling yoke upon rearward movement of said tractor relative to said implement while said frame of the latter is sustained in said elevated position, and stop means formed integrally with said complementary coupling element and presenting a generally vertical stop surface cooperable with said coupling yoke to limit displacement of the latter and of said complementary coupling element relative to each other upon alignment of said coupling yoke and complementary coupling element in coupling pin receiving relation with each other by said rearward movement of said tractor.

3. In an agricultural machine, the combination of a tractor having a rear axle structure, a coupling yoke mounted in a depending position on and connected in draft transmitting relation with said axle structure, a coupling pin extending through apertured leg portions of said yoke on a horizontal axis transversely of said tractor, a complementary coupling element pivotally connected with said coupling yoke by said coupling pin, an implement having a frame and ground engaging elements adapted to sustain said frame independently of said tractor in an elevated position above the ground, a hinge pin extending through a vertical sleeve portion of said complementary coupling element and mounted in a vertical position on a forward portion of said implement frame, a forwardly tapered nose piece forming an integral part of said complementary coupling element and adapted to enter between said leg portions of said coupling yoke, and a socket projection formed integerally with said complementary coupling element and presenting a generally horizontal guide surface and a generally vertical stop surface, said nose piece and said guide and stop surfaces being cooperable with said coupling yoke to vertically and horizontally align said coupling yoke and said complementary coupling member in coupling pin receiving relation with each other upon rearward movement of said tractor relative to said implement while said frame of the latter is sustained in said elevated position.

4. In an agricultural machine, the combination of a tractor, a plow including a pull bar and a beaming device for vertically angling said pull bar, said tractor having a rear axle structure and a pair of axially spaced supporting wheels mounted thereon, a coupling yoke mounted under and connected in draft transmitting relation with said axle structure between said wheels and having a pair of horizontally aligned coupling pin receiving openings in depending leg portions thereof, a complementary coupling element connected to and supported by said pull bar independently of said tractor at generally the same elevation above the ground as that of said coupling pin receiving openings, said complementary coupling element comprising a body member having a transverse trunnion yoke merging with a converging nose piece which, as viewed in plan, extends forwardly therefrom between and beyond said depending leg portions, and having a pair of transversely aligned oppositely extending socket projections presenting forwardly and upwardly facing socket surfaces generally complementary to and engaging, respectively, rear lower end and bottom surfaces presented by said depending leg portions, said transverse trunnion yoke extending between and generally above said socket projections, whereby when the latter engage said rear lower end and bottom surfaces the trunnion yoke is disposed between said depending leg portions in transverse alignment with said pair of coupling pin receiving openings; and a pivot pin removably inserted through said trunnion yoke and said coupling pin receiving openings of said coupling yoke.

5. In combination, a mobile structure incorporating a draft element presenting spaced depending portions disposed in aligned transverse relation with respect to the normal direction of travel, said depending portions having an aligned pair of pin receiving openings extending transversely therethrough, a hitch means comprising a body member having a converging nose piece, as viewed in plan, extending forward therefrom between and beyond said depending portions, and having a pair of transversely aligned, oppositely extending projections presenting forwardly and upwardly facing socket surfaces generally complementary to and engaging rear lower end surfaces presented by said depending portions, said body member also having a transverse trunnion yoke extending between and generally above said socket surfaces whereby when the latter engage said rear lower end surfaces the trunnion yoke is disposed between said depending portions in transverse alignment with said pair of pin receiving openings, and a pivot pin removably inserted through said aligned trunnion yoke and openings.

6. A hitch means of the type adapted to be disposed between a pair of laterally aligned draft elements and detachably connected thereto for up and down pivotal movement about a transverse coupling pin, said hitch means comprising a body member having a transverse trunnion yoke and a nose piece merging therewith which, as viewed in plan, projects and converges forwardly from said trunnion yoke, said trunnion yoke presenting an aperture adapted to receive said coupling pin, and a pair of transversely aligned projections extending outwardly in opposite directions from the sides of said trunnion yoke, each of said projections presenting a generally horizontal sliding surface in downwardly spaced relation to said aperture and a forwardly facing stop surface in upwardly extending relation to said sliding surface, said sliding surface inclining upwardly toward said stop surface and the latter being disposed rearwardly of said aperture so that cooperative engagement of said draft elements with said sliding and stop surfaces of said projections will be effective to align said pin receiving aperture of said trunnion yoke with complementary pin receiving apertures of said draft elements.

7. The hitch means set forth in claim 6 wherein said nose piece presents a top surface having an upstanding central flange extending from a midportion of said yoke in converging relation with respect to said top surface.

References Cited in the file of this patent

UNITED STATES PATENTS

| | | |
|---|---|---|
| 1,342,949 | Falco | June 8, 1920 |
| 2,027,499 | Tully | Jan. 14, 1936 |
| 2,471,689 | Hotchkiss | May 31, 1949 |
| 2,483,565 | Strandlund | Oct. 4, 1949 |
| 2,515,991 | Dufour | July 18, 1950 |
| 2,531,559 | Deviley | Nov. 28, 1950 |
| 2,533,521 | Silver et al. | Dec. 12, 1950 |
| 2,559,962 | Hudson | July 10, 1951 |
| 2,567,737 | Silver et al. | Sept. 11, 1951 |
| 2,640,404 | Scholfield | June 2, 1953 |